L. T. Wells. Sheet 1. 3 Sheets.

Printing Press.

No. 3500. Reissued June 8. 1869.

L. T. Wells. Sheet 2. 3 Sheets.

Printing Press.

No. 3500. Reissued Jun. 8. 1869.

L. T. Wells Sheet 3. 3 Sheets.

Printing Press.

No. 3500. Reissued Jun. 8. 1869.

United States Patent Office.

LEMUEL T. WELLS, OF ST. LOUIS, MISSOURI.

*Letters Patent No.* 12,568, *dated March* 20, 1855; *extended seven years; reissue No.* 3,500, *dated June* 8, 1869.

IMPROVEMENT IN PRINTING-PRESSES.

The Schedule referred to in these Letters Patent and making part of the same.

*To all whom it may concern:*

Be it known that I, LEMUEL T. WELLS, of the city and county of St. Louis, in the State of Missouri, have invented a new and useful Improvement in Printing-Presses; and I hereby declare the following to be a full, clear, and exact description thereof, reference being had to the accompanying drawings, making part of this specification.

It being necessary, for convenience of feeding, that the platen should stand at about an angle of thirty degrees from the horizontal, it is customary, in order to secure the above position, and at the same time to economize the power expended in opening and closing the press, to give the type-bed a leaning position forward.

This feature is objectionable, particularly in printing large forms, because the central type, being inefficiently sustained, are liable to be shaken out by the motion of the press, and this takes place occasionally, even when the clamps are forced so tight as to injure the type which is situated at the margin.

Another circumstance which renders the swinging platen ill adapted to large sheets, is the great power that is required to swing the arms and platen sufficiently to afford the requisite opening for feeding and delivery.

By my plan of construction, I am able to produce a wide opening, by means of a short, powerful crank.

It is my aim, in this invention, to extend the usefulness of the vibrating press, by presenting the bed and platen in their most convenient respective positions, both for printing and for feeding, without too great an expenditure of power in swinging the arms, and without the liability of displacing the type.

In the accompanying drawings—

Figure 1:
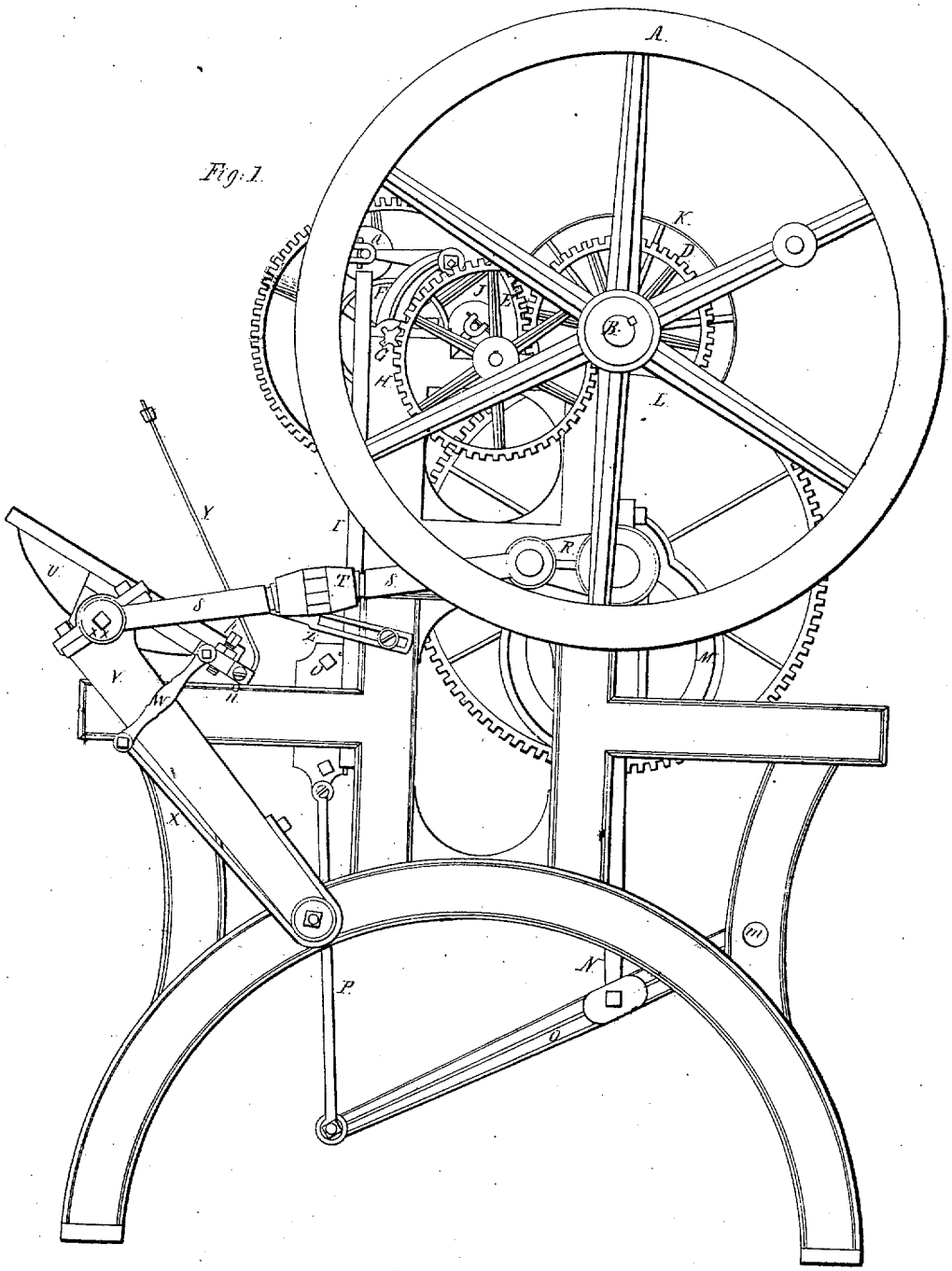
Figure 1 is a side elevation of a press embodying my invention.
Figure 2:
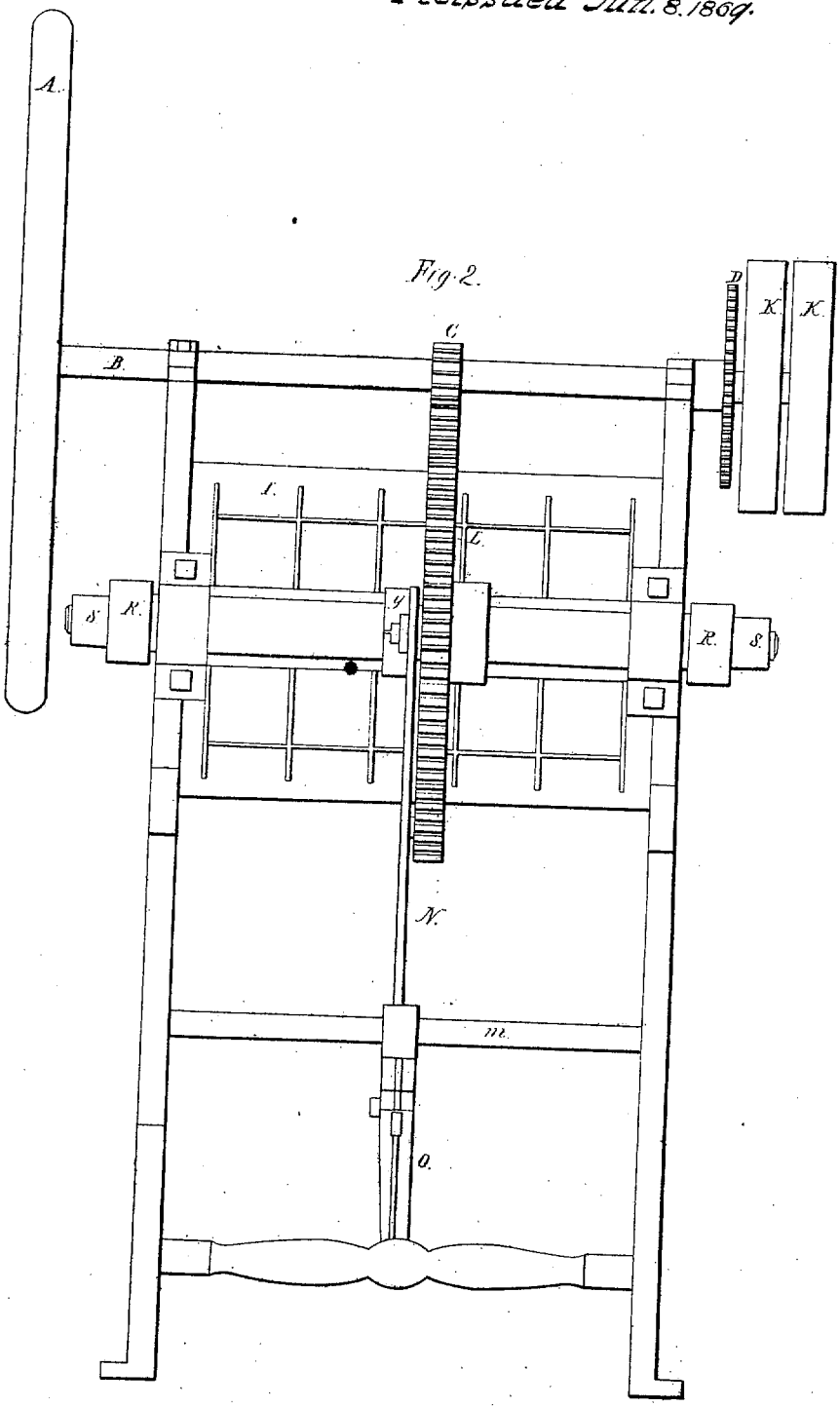
Figure 2 is a rear elevation.
Figure 3:
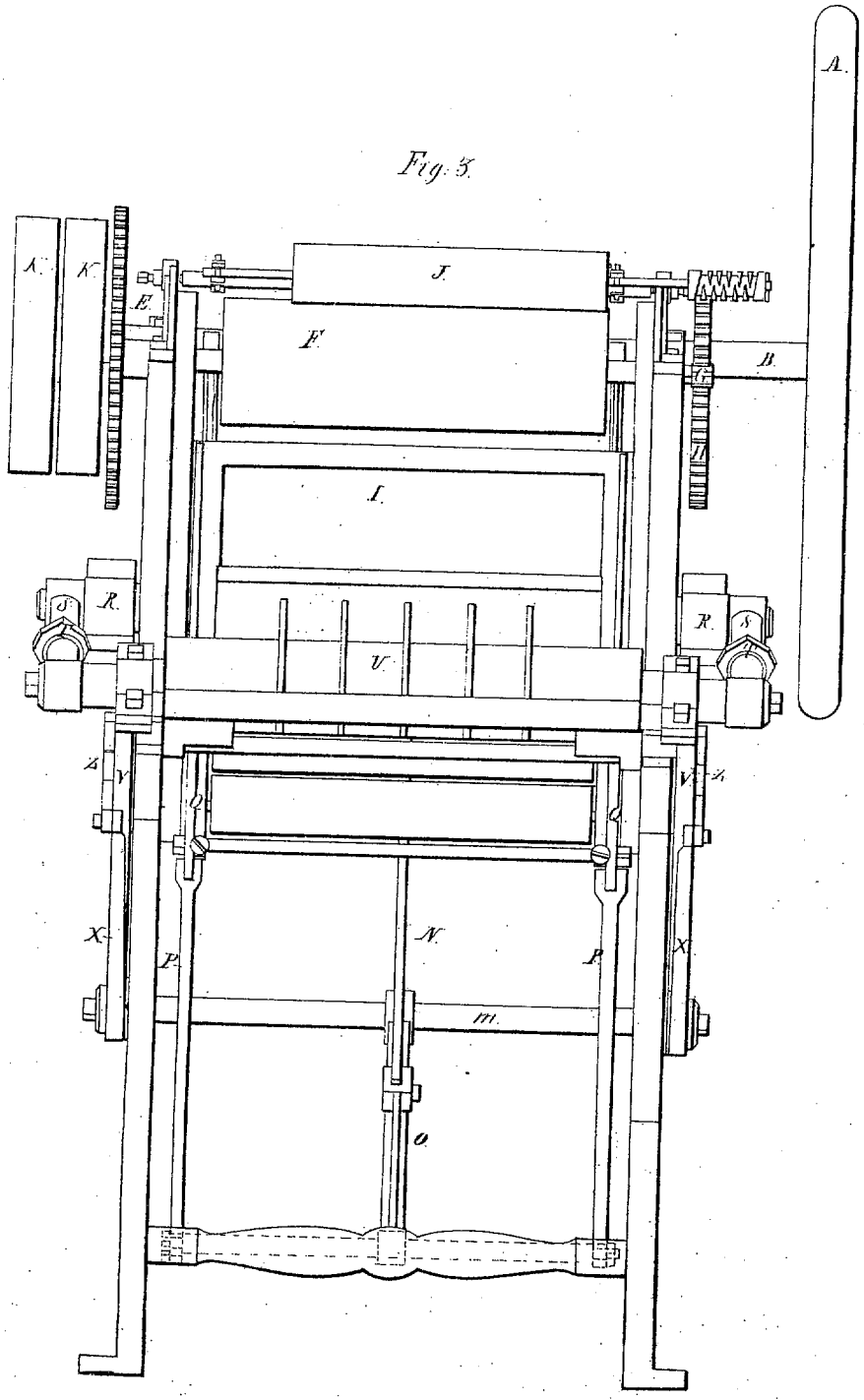

Figure 3, a front elevation thereof.

The actuating-mechanism, and the various devices for gathering, distributing, and applying the ink, not differing essentially from other plans now in use, need no specific description.

The bed I is permanently attached, in a vertical or somewhat back-leaning position, to the frame.

The arms V may be vibrated by the usual crank R and pitman S, the length of the latter being adjustable by a suitable screw, T, or its equivalent.

The platen U, instead of having a uniform vibration with the arms V, is capacitated for a distinct rotation upon a pivot, X X.

This distinct rotation is effected by the reaction of a stationary pin, *n*, projecting from the frame, and against which, at a certain stage of its opening motion, the lower portion of the platen impinges. This results in a compound motion of the platen, as follows:

The platen, at first moving with the arm a distance sufficient to lift the sheet square off of the type, then impinging against the pin *n*, the lower edge is held nearly stationary, while the upper or outer edge immediately sinks or settles down, so as to present the platen in any approach to a horizontal position that may be deemed to best facilitate the action of feeding.

The term "rotation," in the preceding and subsequent passages of this specification, does not imply a complete revolution, but such partial rotation as may be requisite to effect the object in view.

The sheets being customarily pointed (adjusted to their place) at their lower edge, this nearly stationary condition of the lower part of the platen at the time of feeding is of the greatest convenience, and very much expedites and facilitates the accurate placing of the sheet, the hand not having to place and adjust the sheet upon a retreating surface.

The facility for any desired opening of the platen without much expenditure of power, and also the secure position of the type, enable me to apply this most economical form of press to much larger impressions than are now practicable.

When not under the action of the pin *n*, the lower edge of the platen is held down firmly against the arms V by the spring X and rods W; but I do not desire to be understood as confining my claim to any specific means of rotation or retraction, as the former may be accomplished by a link, eccentric-groove, or other device, and the latter by a cam or weight.

I claim herein as new, and of my invention—

1. A turning or partially-rotating platen, upon a vibrating arm or arms, substantially as and for the purpose set forth.

2. The platen U, hinged or pivoted to vibrating arms V, in combination with the stationary pin or pins *n* and retracting-springs X, or equivalent devices, for the purposes explained.

In testimony of which invention, I hereunto set my hand.

LEMUEL T. WELLS.

Witnesses:

GEO. H. KNIGHT,
CHAS. WELLS.